US012547794B2

(12) United States Patent
Song et al.

(10) Patent No.: US 12,547,794 B2
(45) Date of Patent: Feb. 10, 2026

(54) VIRTUAL INTEGRATION TEST SYSTEM AND METHOD

(71) Applicant: Cameron International Corporation, Houston, TX (US)

(72) Inventors: Fei Song, Sugar Land, TX (US); Christopher Sanchez, Houston, TX (US); Ke Ken Li, Sugar Land, TX (US); Stuart Robinson, Katy, TX (US); Kirk Guidry, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 1119 days.

(21) Appl. No.: 17/595,571

(22) PCT Filed: Jun. 11, 2020

(86) PCT No.: PCT/US2020/037270
§ 371 (c)(1),
(2) Date: Nov. 19, 2021

(87) PCT Pub. No.: WO2020/252187
PCT Pub. Date: Dec. 17, 2020

(65) Prior Publication Data
US 2022/0222395 A1 Jul. 14, 2022

Related U.S. Application Data

(60) Provisional application No. 62/859,810, filed on Jun. 11, 2019.

(51) Int. Cl.
G06F 30/20 (2020.01)
G06F 30/17 (2020.01)
G06T 7/00 (2017.01)

(52) U.S. Cl.
CPC .............. *G06F 30/20* (2020.01); *G06F 30/17* (2020.01); *G06T 7/0004* (2013.01); *G06T 2207/10028* (2013.01)

(58) Field of Classification Search
CPC .......... G06F 30/00; G06F 30/20; G06F 30/17; G06F 30/23; G06T 7/0004; G06T 2207/10028; G01B 21/04
USPC ....................................................... 703/7, 6
See application file for complete search history.

(56) References Cited

U.S. PATENT DOCUMENTS 8,050,897 B2 11/2011 Teng et al.
2002/0123812 A1 9/2002 Jayaram et al.
(Continued)

FOREIGN PATENT DOCUMENTS

| CN | 107292052 A | * | 10/2017 | ......... E21D 21/0026 |
| KR | 1020130107874 A | | 10/2013 | |
| WO | WO-2014205371 A1 | * | 12/2014 | ............. G06F 30/17 |

OTHER PUBLICATIONS

Jansson, Johan et al., "Combining Deformable and Rigid Body Mechanics Simulation", Jul. 15, 2002, Elsevier. (Year: 2002).*
(Continued)

*Primary Examiner* — Cedric Johnson
(74) *Attorney, Agent, or Firm* — Kyle R. Miiller

(57) ABSTRACT

A virtual integration test system includes a computer configured to receive data indicative of measured dimensions of as-built components. The computer is also configured to perform a motion mechanics simulation on at least two deformation-uncritical components of the as-built components and perform a deformation mechanics simulation on at least one deformation-critical component of the as-built components. The motion mechanics simulation and the deformation mechanics simulation are performed concurrently within a simulation environment. In addition, the (Continued)

computer is configured to determine interface and integration compatibility of the as-built components based on the motion mechanics simulation and the deformation mechanics simulation, and to output an output signal indicative of the interface and integration compatibility of the as-built components.

20 Claims, 6 Drawing Sheets

(56) References Cited

U.S. PATENT DOCUMENTS

| | | |
|---|---|---|
| 2013/0187930 A1 | 7/2013 | Millman |
| 2016/0098499 A1* | 4/2016 | Heirman .................. G06F 30/20 |
| | | 703/2 |
| 2017/0242423 A1 | 8/2017 | Oya et al. |
| 2018/0095450 A1* | 4/2018 | Lappas .................. B33Y 10/00 |
| 2018/0113963 A1 | 4/2018 | Kordon et al. |

OTHER PUBLICATIONS

Xia, F. et al., "Gibson Env: Real-World Perception for Embodied Agents", arxiv.org, Cornell University Library, 201 Olin Library, Cornell University, Ithaca, NY, 2018, 12 pages.

International Search Report and Written Opinion issued in PCT Application PCT/US2020/037270, dated Sep. 21, 2020 (9 pages).

John Jansson et al., Combining deformable and rigid body mechanics simulation, Jul. 15, 2002, pp. 1-18.

* cited by examiner

VIRTUAL INTEGRATION TEST SYSTEM AND METHOD

CROSS-REFERENCE TO RELATED APPLICATION

The present document is a National Stage Entry of International Patent Application No. PCT/US2022/037270, filed Jun. 11, 2020, which is based on and claims priority to U.S. Provisional Application Ser. No. 62/859,810, filed Jun. 11, 2019, which is incorporated herein by reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. These drilling and production systems include a variety of components that are integrated to enable hydrocarbon extraction and/or production. To ensure that the various and numerous components of these systems effectively integrate into the complete system (e.g., such that the components fit together without interface, no leakage paths are formed between components, movement of one component is not blocked by another component, etc.), the components are assembled and tested. Assembling and testing the components within the integrated system may demonstrate that the system operates as intended under the expected operating conditions. Unfortunately, assembling and testing the components within the integrated system is time-consuming and expensive. In addition, the tools and equipment used to construct the integrated system for testing may be unavailable for operational systems (e.g., drilling and production systems).

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
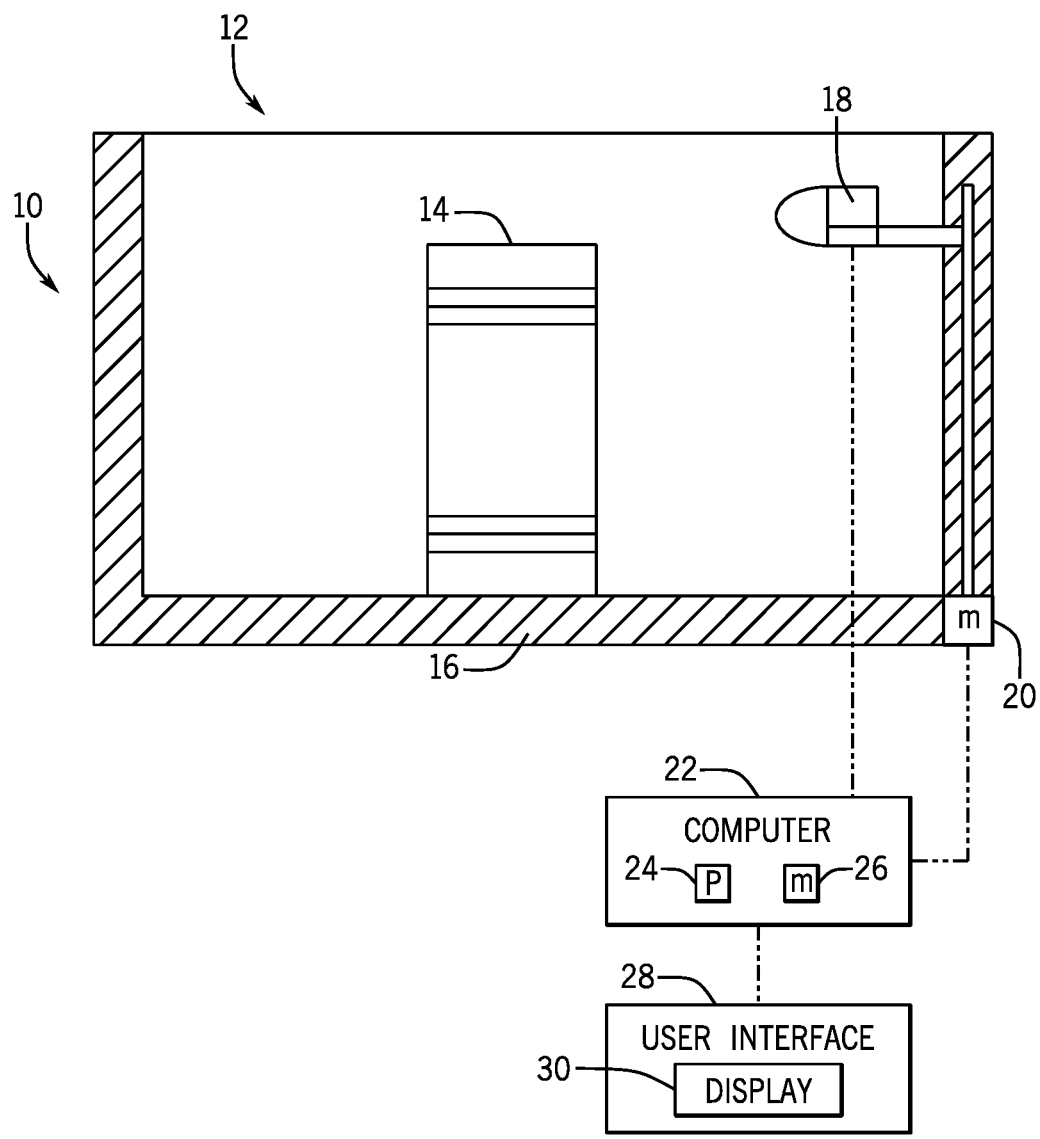
FIG. 1 is a schematic diagram of an embodiment of a virtual integration test system.

FIG. 1 is a schematic diagram of an embodiment of a virtual integration test system 10. As discussed in detail below, the virtual integration test system 10 is configured to determine interface and integration compatibility of multiple as-built components (e.g., of a drilling or production system) based on a motion mechanics simulation of deformation-uncritical components and a deformation mechanics simulation of deformation-critical components. In certain embodiments, the virtual integration test system 10 includes a test stand 12 configured to output data indicative of measured dimensions of the as-built components 14. In the illustrated embodiment, the test stand 12 includes a structure 16 configured to support at least one as-built component 14. The structure 16 may include a base, an armature, wire supports, other suitable device(s) configured to support at least one as-built component 14, or a combination thereof. As used herein, "as-built component" refers to a physical component (e.g., of a drilling or production system) that is prepared for integration/installation into a system (e.g., drilling or production system). For example, the as-built component may be stored within a storage facility awaiting integration/installation into the system. The as-built component may be newly manufactured, previously manufactured (e.g., months or years prior to use) and unused, or previously used within a system (e.g., drilling or production system).

Furthermore, in the illustrated embodiment, the test stand 12 includes scanning device(s) 18 configured to output data indicative of measured dimensions of the as-built component(s) 14. The scanning device(s) 18 may include any suitable device(s) configured to facilitate determination of dimensions of the as-built component(s). For example, in certain embodiments, the scanning device(s) may include a three-dimensional (3D) scanner configured to output point cloud data that may be used to determine dimensions of the as-built component(s) 14. In such embodiments, the scanning device(s) may include a LIDAR system (e.g., time-of-flight LIDAR system, etc.) configured to emit laser radiation toward the as-built component(s) and to receive return laser radiation from the as-built component(s). The LIDAR system may generate point cloud data from the received laser radiation, thereby facilitating determination of the dimensions of the as-built component(s) 14. In addition, in certain embodiments, the scanning device(s) may include an imaging system (e.g., camera) configured to capture image(s) of the as-built component(s) 14, thereby facilitating determination of the dimensions of the as-built component(s) 14. Furthermore, in certain embodiments, the scanning device(s) may include a RADAR system, an ultrasonic system, an infrared system (e.g., passive infrared system, active infrared system, etc.), an X-ray system, or another suitable type of non-contact scanning system. Furthermore, in certain embodiments, the scanning device(s) may include a contact system, such as a coordinate measuring machine (CMM). Any of the scanning devices disclosed above may be used alone or in combination with any of the other scanning devices disclosed above. Furthermore, while one scanning device 18 is shown in FIG. 1, the test stand 12 may include multiple scanning devices of the same type and/or of different types.

In the illustrated embodiment, the test stand 12 includes an actuator assembly 20 configured to move the scanning device(s) 18 relative to the as-built component(s) 14 and/or to move the structure 16/as-built component(s) 14 relative to the scanning device(s) 18. The actuator assembly 20 may include any suitable type(s) of actuator(s), such as electric motor(s), hydraulic motor(s), pneumatic motor(s), hydraulic cylinder(s), linear actuator(s), pneumatic cylinder(s), etc. The actuator assembly 20 may move the scanning device(s) 18 and/or the as-built component(s) 14 to enable the scanning device(s) 18 to monitor various portions of the as-built component(s). Furthermore, in certain embodiments, the actuator assembly may include one or more actuators configured to move a first type of scanning device and one or more actuators configured to move a second type of scanning device. For example, the first scanning device may include a non-contact scanning system (e.g., LIDAR system, etc.), and the respective actuator(s) may be configured to move the non-contact scanning system around an exterior of the as-built component(s). In addition, the second scanning device may include a contact scanning system (e.g., CMM, etc.), and the respective actuator(s) may be configured to move the contact scanning system within an interior of the as-built component(s).

Furthermore, in certain embodiments, the actuator assembly may include one or more actuators configured to drive a conveying device (e.g., arm, rod, etc.) to move an as-built component from a receiving area (e.g., a conveyor belt, etc.) to the test stand 12 to facilitate scanning by the scanning device(s). The actuator assembly may also include one or more actuators configured to drive another conveying device (e.g., arm, rod, etc.) to move the as-built component from the test stand to an output area (e.g., conveyor belt, etc.). Accordingly, the test stand may scan multiple as-built components in succession (e.g., automatically without direct operator interaction). For example, a first conveyor belt may move a first as-built component to the receiving area, the actuator assembly may drive the first conveying device to move the first as-built component from the receiving area to the test stand, the actuator assembly may drive the second conveying device to move the first as-built component from the test stand to the output area after scanning, and the second conveyor belt may move the first as-built component to a storage area. The process may be repeated for a second as-built component. While two conveying devices are disclosed above, in certain embodiments, the virtual integration test system may include a single conveying device configured to move each as-built component from the receiving area to the test stand, and from the test stand to the output area. In addition or alternatively, the structure 16 may support multiple as-built components, and the scanning device(s) may scan the multiple as-built components concurrently or in succession. While the test stand includes the actuator assembly in the illustrated embodiment, in other embodiments the actuator assembly may be omitted. Furthermore, while the scanning device(s) are elements of the test stand in the illustrated embodiment, in other embodiments, the scanning device(s) may be element(s) of another suitable system (e.g., a handheld scanner, a system mounted to the as-built component, etc.). The scanning device(s) 18 may output data indictive of hundreds, thousands, millions, or more measured dimensions of each as-built component 14 of a system (e.g., drilling or production system, etc.), thereby facilitating virtual integration testing of the as-built components of the system.

In the illustrated embodiment, the scanning device(s) 18 and the actuator assembly 20 are communicatively coupled to a computer 22. In certain embodiments, the computer 22 is an electronic computer having electrical circuitry configured to receive data indicative of measured dimensions of the as-built component(s) 14 from the scanning device(s) 18. In the illustrated embodiment, the computer 22 includes a processor 24, such as a microprocessor, and a memory device 26. The computer 22 may also include one or more storage devices and/or other suitable components. The processor 24 may be used to execute software, such as software for determining interface and integration compatibility of the as-built components, and so forth. Moreover, the processor 24 may include multiple microprocessors, one or more "general-purpose" microprocessors, one or more special-purpose microprocessors, and/or one or more application specific integrated circuits (ASICS), or some combination thereof. For example, the processor 24 may include one or more reduced instruction set (RISC) processors.

The memory device 26 may include a volatile memory, such as random access memory (RAM), and/or a nonvolatile memory, such as read-only memory (ROM). The memory device 26 may store a variety of information and may be used for various purposes. For example, the memory device 26 may store processor-executable instructions (e.g., firmware or software) for the processor 24 to execute, such as instructions for determining interface and integration compatibility of the as-built components, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining interface and integration compatibility of the as-built components, etc.), and any other suitable data.

In certain embodiments, the computer 22 is configured to receive data indictive of measured dimensions of each as-built component 14 of a system (e.g., drilling or production system, etc.). In addition, the computer 22 is configured to perform a motion mechanics simulation on at least two deformation-uncritical components and to perform a deformation mechanics simulation on at least one deformation-critical component. As discussed in detail below, the motion mechanics simulation and the deformation mechanics simulation are performed concurrently within a simulation environment. Furthermore, the computer 22 is configured to determine interface and integration compatibility of the as-built components of the system based on the motion mechanics simulation and the deformation mechanics simulation. The computer 22 is also configured to output an output signal indicative of the interface and integration compatibility of the as-built components. Because the virtual integration test system utilizes the motion mechanics simulation for the deformation-uncritical components, the processing time associated with determining the interface and integration compatibility of the as-built components may be significantly reduced, as compared to using the deformation mechanics simulation for all of the as-built components within the system.

In the illustrated embodiment, the virtual integration test system 10 includes a user interface 28 communicatively coupled to the computer 22. The user interface 28 is configured to receive input from an operator and to present information to the operator. In the illustrated embodiment, the user interface 28 includes a display 30 configured to present visual information to the operator. In certain embodiments, the display 30 may include a touch screen interface configured to receive input from the operator. In certain embodiments, the computer 22 is configured to output the output signal indicative of the interface and integration compatibility of the as-built components to the user interface 28. In such embodiments, the user interface is configured to present information associated with the interface and integration compatibility to the operator. For example, in response to determining that one or more as-built components of the system do not have interface and integration compatibility, the computer may instruct the user interface (e.g., via the output signal) to present information indicative of the determination to the operator (e.g., via the display).

In certain embodiments, the operator may input data indicative of measured dimensions of at least one as-built component to the user interface 28. In response, the computer 22 may receive data indictive of the measured dimensions of the at least one as-built component from the user interface 28. For example, the scanning device(s) 18 of the test stand 12 may output data indicative of measured dimensions of an exterior of one or more as-built components, and the operator may input data indictive of measured dimensions of an interior of the one or more as-built components (e.g., in response to the operator manually measuring the interior of the one or more as-built components). Furthermore, in certain embodiments, the scanning device(s) may not be communicatively coupled to the computer. In such embodiments, the scanning device(s) may be configured to store data indictive of the measured dimensions of one or more as-built components on a removable storage medium (e.g., thumb drive, CD, removable hard drive, etc.), and the computer may be configured to receive the data indictive of the measured dimensions of the one or more as-built components from the storage medium.

In certain embodiments, the computer may be configured to control the actuator assembly 20 to facilitate scanning of the as-built component(s). For example, the computer 22 may control the actuator assembly 20 to move the scanning device(s) 18 and/or the as-built components 14 to enable the scanning device(s) 18 to monitor various portions of the as-built component(s). Furthermore, in certain embodiments, the computer may control the conveyor belt(s), the conveying device(s) (e.g., via the actuator assembly), and the actuator assembly to automatically scan multiple as-built components is succession. While the as-built components of a drilling or production system are disclosed above, the virtual integration test system disclosed herein may be used to determine interface and integration compatibility of as-built components of any suitable system in which the as-built components interface with one another (e.g., downhole equipment, exploration systems, oil field equipment in general, etc.).

Figure 2:
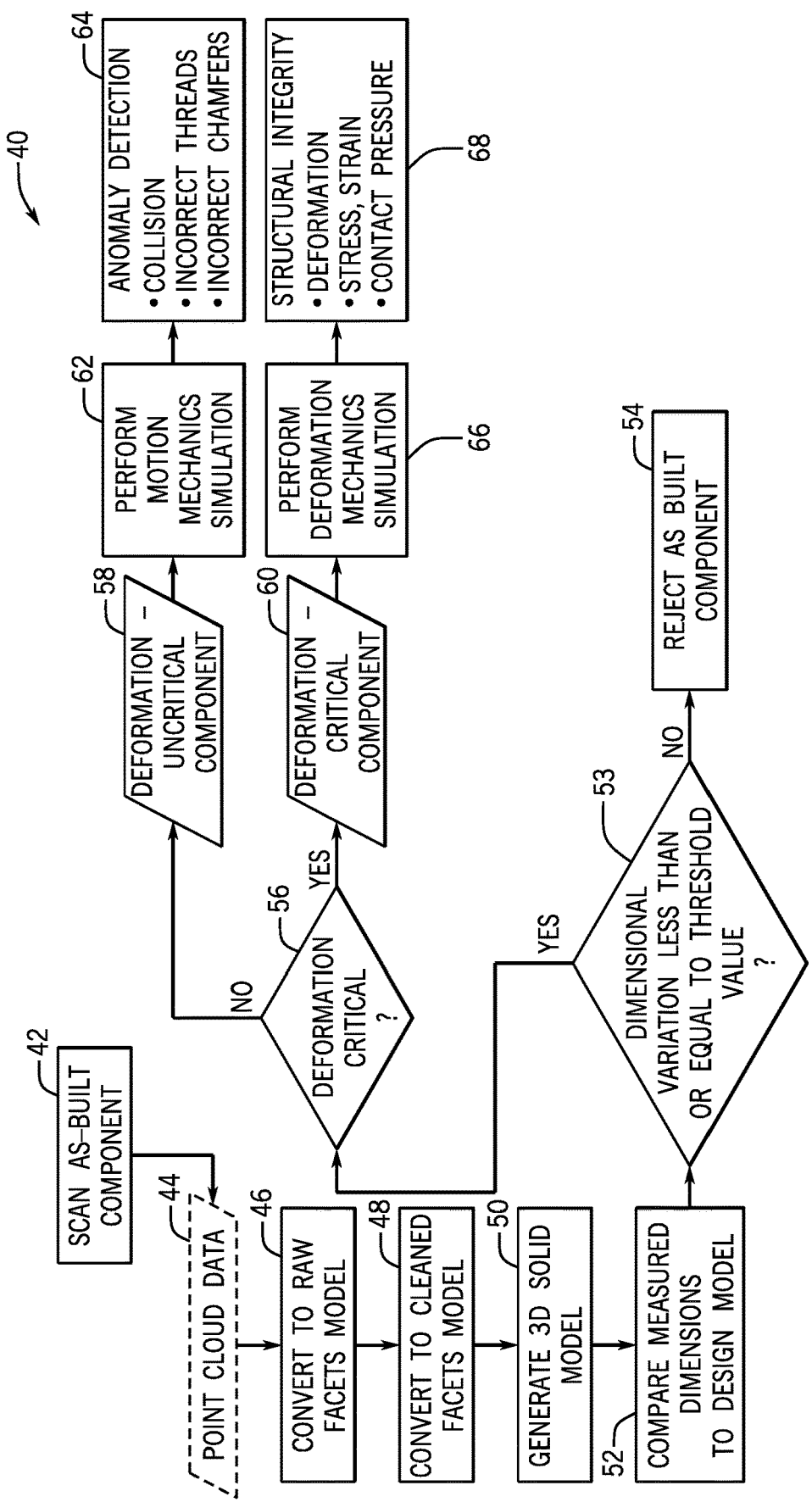
FIG. 2 is a flow diagram of an embodiment of a method for performing a virtual integration test.

FIG. 2 is a flow diagram of an embodiment of a method 40 for performing a virtual integration test. The method 40 includes scanning as-built components and determining interface and integration compatibility of the as-built components. The method 40 may be performed by the computer disclosed above with reference to FIG. 1, by another suitable computer, or a combination thereof. In the illustrated embodiment, the method 40 begins by performing a 3D scan of an as-built component, as represented by block 42. As previously discussed, the 3D scanning of the as-built component may be performed by scanning device(s), such as a LIDAR system, an imaging system, a RADAR system, an ultrasonic system, an infrared system, an X-ray system, a contact system, another suitable scanning system, or a combination thereof. The scanning of the as-built component generates data indicative of measured dimensions of the as-built component. For example, in certain embodiments (e.g., embodiments in which the scanning device(s) include a LIDAR system), the data indicative of the measured dimensions of the as-built component may be in the form of a point cloud 44. In other embodiments, the data indicative of the measured dimensions may be in another suitable form (e.g., numbers in a table, a list of coordinates, etc.). In certain embodiments, the data indicative of the measured dimensions of the as-built component may be converted to a raw facets model, such as a stereolithographic (STL) model, as represented by block 46. The raw facets model may include multiple surfaces that generally form the shape of the as-built component.

In certain embodiments, the raw facets model may be converted to a cleaned facets model, as represented by block 48. For example, the raw facets model may have missing surfaces due to an incomplete scan (e.g., because one or more portions of the as-built component are inaccessible by the scanning device(s)), and/or the raw facets model may have features that are not present within the as-built component (e.g., dirt and/or debris on a surface of the as-built component, grease within threads of the as-built component, etc.). The missing surfaces may be added (e.g., based on an interpolation technique, such as linear interpolation, polynomial interpolation, etc., based on data from another portion of the as-built component having the same shape/topography, based on a design model of the as-built component, etc.), and/or the extraneous features may be removed (e.g., based on expected buildup of dirt, debris, grease, etc.). Next, as represented by block 50, the cleaned facets model is converted to a 3D solid model having the measured dimensions. As a result, a 3D solid model representing the as-built component is generated. In certain embodiments, the computer may automatically convert the raw facets model to the cleaned facets model without operator input, or the computer may convert the raw facets model to the cleaned facets model using feedback from the operator. Furthermore, while the method includes the step of converting the raw facets model to the cleaned facets model in the illustrated embodiment, the conversion step may be omitted in certain embodiments. In such embodiments, the raw facets model may be converted directly to the 3D solid model.

As represented by block 52, the measured dimensions of the as-built component is compared to the dimensions of a design model of the as-built component. For example, in certain embodiments, multiple dimensions of the 3D solid model generated in block 50 are compared to corresponding dimensions of the design model of the as-built component. The design model (e.g., computer-aided design (CAD) model) is the model used to manufacture the as-built component. In response to determining that a dimensional variation between the measured dimensions of the as-built component and the dimensions of the design model is greater than a threshold value, as represented by block 53, the as-built component is rejected, as represented by block 54. However, if the dimensional variation is less than or equal to the threshold value, a motion mechanics simulation or a deformation mechanics simulation is performed on the as-built component, as discussed in detail below. In certain embodiments, the dimensional variation that is compared to the threshold value may include a single dimension of the as-built component. For example, the dimensional variation may correspond to the largest difference between a measured dimension of the as-built component and the corresponding dimension of the design model. Accordingly, if the largest dimensional difference is greater than the threshold value, the as-built component may be rejected. Furthermore, in certain embodiments, the dimensional variation that is compared to the threshold value may include a number of dimensional differences that are greater than a threshold difference. For example, the number of dimensional differences between the measured dimensions of the as-built component and the corresponding dimensions of the respective design model that are greater than a threshold difference may be counted. If the number of dimensional differences is greater than the threshold value, the as-built component may be rejected. Furthermore, in certain embodiments, the dimensional variation that is compared to the threshold value may include an average difference between the measured dimensions of the as-built component and the corresponding dimensions of the design model. In such embodiments, the as-built component may be rejected if the average dimensional difference is greater than the threshold value. In addition, in certain embodiments, other suitable comparisons may be utilized to determine whether the dimensional variation is greater than the threshold value (e.g., comparison of an average of a certain number of the largest dimensional variations to the threshold value, a combination of any of the comparisons disclosed above, etc.).

The process disclosed above with regard to blocks 42 through 53 may be repeated for each as-built component of the system (e.g., drilling or production system, etc.). In certain embodiments, if any of the as-built components are rejected, the method may terminate and no motion mechanics simulation(s)/deformation mechanics simulation(s) may be performed. However, in other embodiments, the motion mechanics simulation(s)/deformation mechanics simulation(s) may be performed for all as-built components of the system that do not directly interact with the rejected as-built component(s). Furthermore, in certain embodiments, in response to an as-built component being rejected, the motion mechanics simulation(s)/deformation mechanics simulation(s) may be performed with the design model of the rejected as-built component instead of the as-built component. In addition, in certain embodiments, in response to an as-built component being rejected, the operator may be informed of the rejection (e.g., via the user interface) and another as-built component of the same type may be scanned and compared to the respective design model. In certain embodiments, the process of selecting another as-built component of the same type for scanning and comparison may be performed automatically (e.g., by the computer disclosed above with reference to FIG. 1). While the comparison of block 52 is disclosed above with reference to a comparison between the dimensions of the 3D model and the dimensions of the design model, in other embodiments, the comparison may be made directly between the measured dimensions of the as-built component and the dimensions of the design model (e.g., for at least one of the as-built components). In such embodiments, the process of blocks 46 through 50 may be omitted (e.g., for the at least one as-built component).

Next, as represented by block 56, a determination is made regarding whether the as-built component is a deformation-uncritical component, as represented by block 58, or a deformation-critical component, as represented by block 60. As discussed in detail below, a motion mechanics simulation may be performed on the deformation-uncritical components, and a deformation mechanics simulation may be performed on the deformation-critical components. Deformation-critical components may include components that experience greater deformation (e.g., hyper-elastic deformation) during formation and/or operation of the system (e.g., drilling or production system, etc.), and/or components in which tight tolerances are desired. For example, deformation-critical components may include seal(s), ring(s), gasket(s), latch/latches, packing(s), etc. In addition, deformation-uncritical components may include components that experience less deformation during formation and/or operation of the system, and/or components having less sensitive tolerances. For example, deformation-uncritical components may include flange(s), running tool support(s), bushing(s), mandrel(s), housing(s), etc. In certain embodiments, an operator may identify whether each as-built component is a deformation-uncritical component or a deformation-critical component (e.g., via the user interface disclosed above with reference to FIG. 1).

Furthermore, in certain embodiments, one or more as-built components may be automatically identified as deformation-uncritical or deformation-critical (e.g., by the computer disclosed above with reference to FIG. 1). For example, a database (e.g., look-up table, spreadsheet, etc.) of components within a system (e.g., drilling or production system) may be stored within the memory of the computer disclosed above with reference to FIG. 1. The database may include an indication/designation of whether each as-built component is a deformation-critical component or a deformation-uncritical component. At block 56, each as-built component may be identified as deformation-uncritical or deformation-critical based on the indication/designation within the database. In certain embodiments, the database may be created based on a previously performed virtual integration test using components of the same type.

Furthermore, in certain embodiments, one or more as-built components may be automatically identified as deformation-uncritical or deformation-critical (e.g., by the computer disclosed above with reference to FIG. 1) based on at least one property of the as-built component. The at least one property may include a size of the as-built component, resilience of the as-built component, yield strength of the as-built component, tensile strength of the as-built component, thickness of the as-built component, height of the as-built component, use of the as-built component, other suitable properties of the as-built component, or a combination thereof. For example, in certain embodiments, smaller/thinner/shorter components may be automatically identified as deformation-critical components, and larger/thicker/taller components may be automatically identified as deformation-uncritical components. In addition, in certain embodiments, components having higher resilience/yield strength/tensile strength may be automatically identified as deformation-uncritical components, and components having lower resilience/yield strength/tensile strength may be automatically identified as deformation-critical components. Furthermore, components used as seals, rings, latches, or packings may be automatically identified as deformation-critical components, and components used as flanges, running tool supports, bushings, mandrels, or housings may be automatically identified as deformation-uncritical components. The size, thickness, height, other dimensions, or a combination thereof, may be determined based on the data indicative of the measured dimensions of the as-built component. In addition, the resilience, yield strength, tensile strength, use, other material and/or operational properties, or a combination thereof, of one or more components of the system may be stored within a database (e.g., look-up table, spreadsheet, etc.). While the dimensional properties of size, thickness, and height are disclosed above, other dimensional properties, which may be used to determine whether the as-built component is a deformation-uncritical component or a deformation-critical component, may include size relative to another as-built component and size of a portion of the as-built component, such as a flange or an aperture, among others. In addition, while resilience, yield strength, and tensile strength are disclosed above, other physical properties, which may be used to determine whether the as-built component is a deformation-uncritical component or a deformation-critical component, may include hardness, ductility, and toughness, among others.

In certain embodiments, at least one as-built component may be identified as a deformation-uncritical component or a deformation-critical component based on a single property, as disclosed above, or based on multiple properties. For example, an artificial intelligence system, a data analytics system, a machine learning system, or a combination thereof, may be used (e.g., by the computer disclosed above with reference to FIG. 1) to identify each as-built component (e.g., of one or more as-built components) as either deformation-uncritical or deformation-critical based on one or more properties of the as-built component. Furthermore, in certain embodiments, the previous designation/identification of the as-built component may be considered, in addition to the one or more properties, in identifying the as-built component as either a deformation-uncritical component or a deformation-critical component. In addition, in embodiments in which one or more as-built components are automatically identified as either deformation-uncritical or deformation-critical, the operator may approve or override the automatic selection of each component (e.g., via the user interface disclosed above with reference to FIG. 1). However, in other embodiments, the identification process may be fully automatic without possible operator intervention.

In response to identification of an as-built component as a deformation-uncritical component, as represented by block 58, a motion mechanics simulation is performed on the deformation-uncritical component (e.g., using the 3D solid model established in block 50 or another suitable model established by the measured dimensions of the deformation-uncritical component), as represented by block 62. The motion mechanics simulation simulates movement of the deformation-uncritical component relative to other components within the system (e.g., drilling or production system, etc.). Within the motion mechanics simulation, the deformation-uncritical component is simulated as being entirely rigidly. That is, within the motion mechanics simulation, the deformation-uncritical component does not deform in response to applied forces. As represented by block 64, anomalies may be detected (e.g., by the computer disclosed above with reference to FIG. 1) in response to performing the motion mechanics simulation. The anomalies may include a collision between as-built components that blocks movement of one as-built component relative to another as-built component, incorrect threads that block rotation of one threaded as-built component relative to another threaded as-built component, and incorrect chamfers that may establish a significant contact force between as-built components and/or block movement of one as-built component relative to the other as-built component. For example, the motion mechanics simulation may move one as-built component linearly relative to another as-built component to simulate formation and/or operation of the system. In response to detecting a contact force between the as-built components that is greater than a threshold contact force, a collision between the as-built components may be identified (e.g., by the computer disclosed above with reference to FIG. 1). By way of further example, the motion mechanics simulation may rotate one threaded as-built component relative to another threaded as-built component, such that the threads of the threaded components engage one another, to simulate formation and/or operation of the system. In response to detecting a contact force between the threads that is greater than a threshold contact force, incorrect threads may be identified (e.g., by the computer disclosed above with reference to FIG. 1). While detection of a collision, incorrect threads, and incorrect chamfers is disclosed above, other anomalies associated with formation and/or operation of the system may be detected, such as incorrect fillets, misalignment between components, and excessive friction between component, among others. Any detected anomaly indicates that one or more respective as-built components do not have interface and integration compatibility. With regard to the motion mechanics simulation and the deformation mechanics simulation, references to components (e.g., as-built components, deformation-critical components, deformation-uncritical components, etc.) correspond to virtual components within the simulation, and references to manipulation (e.g., movement, rotation, deformation, etc.) refer to virtual manipulation within the simulation.

In response to identification of an as-built component as a deformation-critical component, as represented by block 60, a deformation mechanics simulation (e.g., finite element analysis, etc.) is performed on the deformation-critical component (e.g., using the 3D solid model established in block 50 or another suitable model established by the measured dimensions of the deformation-critical component), as represented by block 66. The deformation mechanics simulation simulates movement and deformation of the deformation-critical component relative to other components within the system (e.g., drilling or production system, etc.). Within the deformation mechanics simulation, the deformation-critical component is simulated as being deformable. Accordingly, within the deformation mechanics simulation, the deformation-critical component deforms and moves in response to applied forces. As represented by block 68, anomalies associated with the structural integrity of the deformation-critical component may be detected (e.g., by the computer disclosed above with reference to FIG. 1) in response to performing the deformation mechanics simulation. The anomalies may include excessive/insufficient deformation of the component, excessive stress and/or strain within the component, and excessive contact pressure between the component and another component of the system. For example, within the deformation mechanics simulation, forces may be applied to the deformation-critical component by one or more other components within the system and/or one or more fluids within the system (e.g., during formation and/or operation of the system). In response to the applied forces, the deformation-critical component may deform and move relative to the other component(s). If the deformation is greater than a threshold value (e.g., greater than an expected deformation), excessive deformation may be identified. For example, if the deformation-critical component is a seal, excessive deformation may reduce the effectiveness of the seal, thereby establishing a potential leakage path. Accordingly, the leakage path may be identified (e.g., by the computer disclosed above with reference to FIG. 1). By way of further example, if the deformation-critical component is a latch, the deformation mechanics simulation may identify excessive stress/strain within the latch in response to determining that the forces applied to the latch are sufficient to cause the latch to disengage. While detection of excessive deformation, excessive stress/strain, and excessive contact pressure are disclosed above, other anomalies associated with the structural integrity of the deformation-critical component may be detected/identified in response to performing the deformation mechanics simulation. Any detected anomaly indicates that one or more respective as-built components do not have interface and integration compatibility.

In certain embodiments, the motion mechanics simulation is performed on at least two deformation-uncritical components, and the deformation mechanics simulation is performed on at least one deformation-critical component. The motion mechanics simulation and the deformation mechanics simulation are performed concurrently within a simulation environment. Accordingly, the deformation-uncritical components that move within the motion mechanics simulation interact with the deformation-critical components that move and deform within the deformation mechanics simulation. Accordingly, at least a portion of the as-built components within the system (e.g., all of the as-built components within the system) may be evaluated for interface and integration compatibility concurrently. Because the virtual integration test system utilizes the motion mechanics simulation for the deformation-uncritical components, the processing time associated with determining the interface and integration compatibility may be significantly reduced, as compared to using the deformation mechanics simulation for all of the as-built components within the system.

In certain embodiments, the virtual integration test system and method disclosed herein may be utilized instead of a physical integration test, in which the actual as-built components are engaged with one another to form the complete system, and the complete system is operated under expected conditions. The costs and duration associated with performing a virtual integration test may be significantly lower than performing a physical integration test. In addition, tools and equipment that may be used for a physical integration test may become available for use with an operational system (e.g., drilling or production system).

Furthermore, the virtual integration test system and method disclosed herein may be utilized during the design process of the components within a system (e.g., a drilling or production system, etc.). For example, after the components are designed, a virtual integration test (e.g., according to the method 40 disclosed above) may be performed with the design models of the components (e.g., for formation and/or operation of the system) to determine the interface and integration compatibility of the components. If at least one component does not perform as expected, the component(s) may be redesign and retested until acceptable performance is achieved. For example, the dimension(s) of the design model(s) of one or more components of the system may be adjusted until the system components have interface and integration compatibility. In certain embodiments, the dimension(s) of the design model(s) may be manually adjusted by an operator. However, in other embodiments, the dimension(s) of the design model(s) may be automatically adjusted via an iterative process (e.g., performed by the computer disclosed above with reference to FIG. 1). In addition, the virtual integration test system and method disclosed herein may be utilized to demonstrate the interface and integration compatibility of the components to a potential customer, thereby demonstrating the effective operation of the system within a simulated/virtual environment. Furthermore, a virtual integration test may provide more information about the performance of certain components, as compared to a physical integration test in which certain information may not be available due to difficulty in placing sensors within certain areas of the system. In addition, because the forces applied to the components within the simulations correspond to forces expected during formation and/or operation of the system, the virtual integration test may be more effective than a physical integration test in which the forces applied to certain components may be limited (e.g., due to limits on the fluid pressure that may be applied, due to limits on the loads that may be applied, etc.). Furthermore, in certain embodiments, the deformation mechanics simulation may consider the effect of temperature during simulation of deformation-critical components. In such embodiments, the structural integrity anomalies (e.g., deformation, stress/strain, contact pressure, etc.) may be determined based on an expected operating temperature. Accordingly, the virtual integration test may be more effective than a physical integration test that is performed at the temperature conditions of the test environment.

Figure 3:
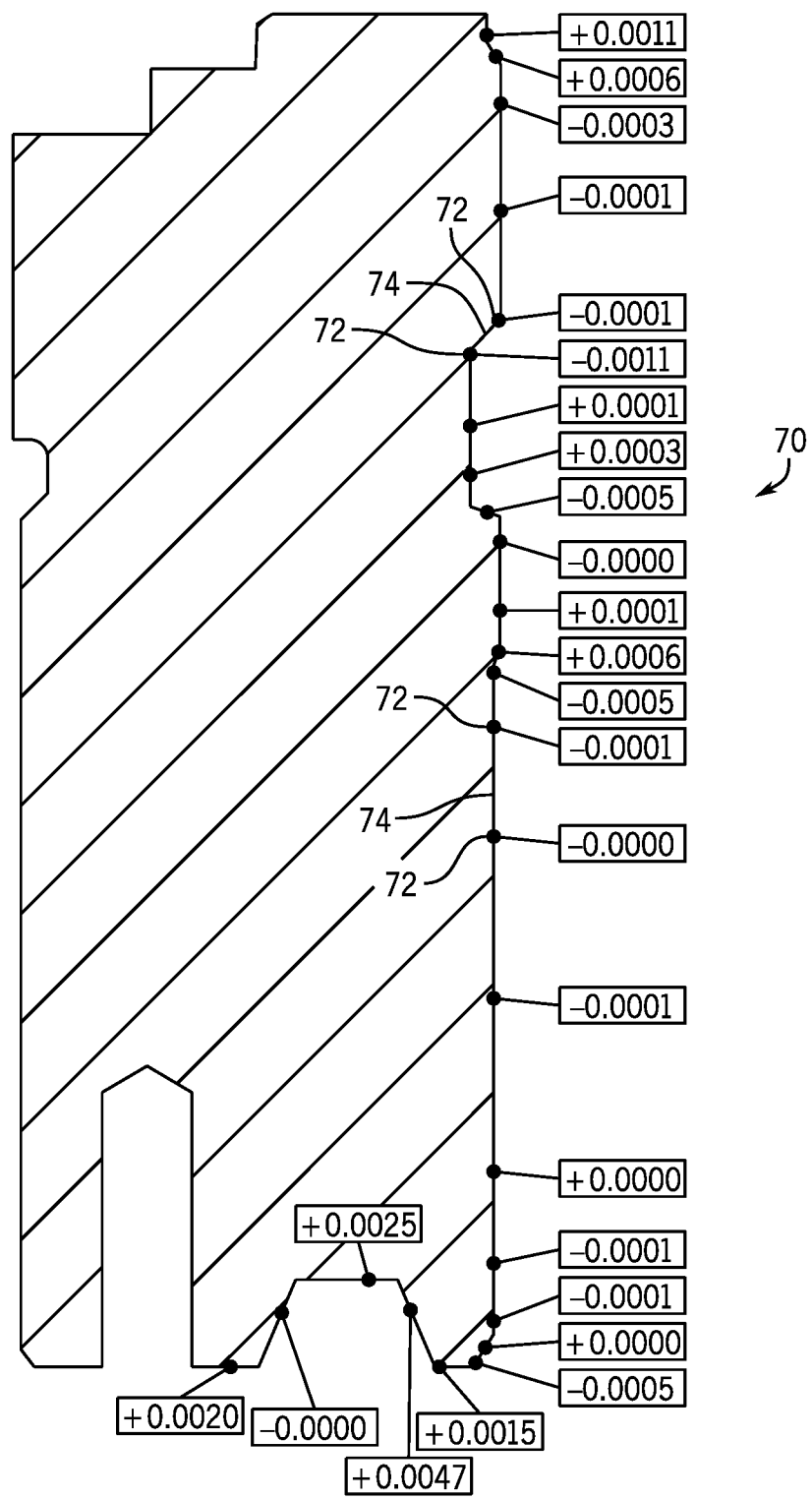
FIG. 3 is a cross-sectional view of an embodiment of an as-built component having a dimensional variation relative to a design model.

FIG. 3 is a cross-sectional view of an embodiment of an as-built component 70 having a dimensional variation relative to a design model. In the illustrated embodiment, the as-built component 70 is represented by multiple points 72 connected by line segments 74. Accordingly, the points 72 and line segments 74 form at least a portion of the data indicative of the measured dimensions of the as-built component 70. As illustrated, each point 72 is labeled with a numerical value that represents the dimensional difference (e.g., in inches) between the point (e.g., measured dimension) on the illustrated as-built component 70 and the corresponding point (e.g., dimension) on the design model. As previously discussed, the as-built component is rejected in response to determining that the dimensional variation between the measured dimensions of the as-built component and the dimensions of the design model is greater than a threshold value. In certain embodiments, the dimensional variation that is compared to the threshold value is a single dimension difference corresponding to the largest difference between a measured dimension of the as-built component and the respective dimension of the design model. For example, the threshold value may be 0.003 inches. In the illustrated embodiment, the largest dimensional difference between a point 72 of the as-built component and a corresponding point on the design model is 0.0047 inches. Because the largest dimensional difference is greater than the threshold value, the as-built component may be rejected.

Figure 4:
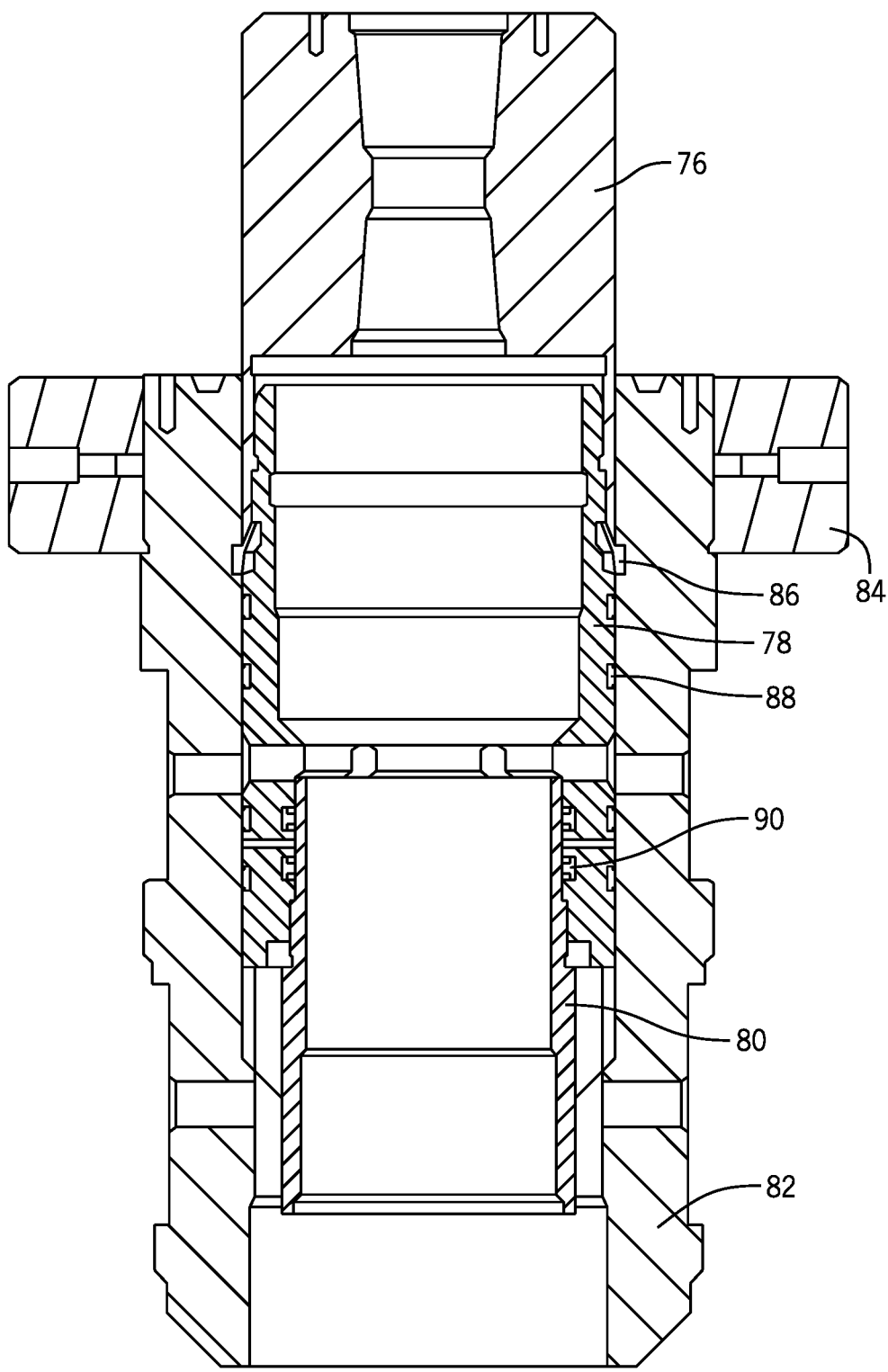
FIG. 4 is a cross-sectional view of an embodiment of multiple as-built components engaged with one another.

FIG. 4 is a cross-sectional view of an embodiment of multiple as-built components engaged with one another. In the illustrated embodiment, the as-built components include a support running tool 76, a support bushing 78, a casing hanger mandrel 80, a casing head housing 82, a threaded flange 84, a lock ring 86, a seal 88, and a ring 90. As previously discussed, deformation-critical components may include components that experience greater deformation during formation and/or operation of the system (e.g., drilling or production system, etc.). For example, deformation-critical components may include seal(s), ring(s), gasket(s), latch/latches, packing(s), etc. In addition, deformation-uncritical components may include components that experience less deformation during formation and/or operation of the system. For example, deformation-uncritical components may include flange(s), running tool support(s), bushing(s), mandrel(s), housing(s), etc. In the illustrated embodiment, the support running tool 76, the support bushing 78, the casing hanger mandrel 80, the casing head housing 82, and the threaded flange 84 may be deformation-uncritical components. In addition, the lock ring 86, the seal 88, and the ring 90 may be deformation-critical components. As previously discussed, the motion mechanics simulation may be performed on the deformation-uncritical components, and the deformation mechanics simulation may be performed on the deformation-critical components.

In certain embodiments, a first portion of an as-built component may be identified as a deformation-critical component, and a second portion of the as-built component may be identified as a deformation-uncritical component. For example, flange(s), lip(s), protrusion(s), or other suitable portions of an as-built component may be identified as deformation-critical component(s), and a body of the as-built component may be identified as a deformation-uncritical component. As a result, the motion mechanics simulation may be performed on the body, and the deformation mechanics simulation may be performed on the other portion(s) (e.g., flange(s), lip(s), protrusion(s), etc.). Within the simulation environment, the body may be considered coupled to the other portion(s).

As previously discussed, the computer may receive data indicative of the measured dimensions of the as-built components. For example, in certain embodiments, the data indicative of the measured dimensions of the as-built components may be converted to respective raw facets models, such as STL models. The raw facets models may be converted to cleaned facets models (e.g., by adding missing features and/or removing extraneous features). Next, the cleaned facets models may be converted to 3D solid models having the measured dimensions. As a result, 3D solid models representing the as-built components are generated. One or more 3D solid models may be used within the motion mechanics simulation(s) and/or the deformation mechanics simulation(s), and/or one or more other suitable models established by the measured dimensions may be used within the simulation(s).

Figure 5:
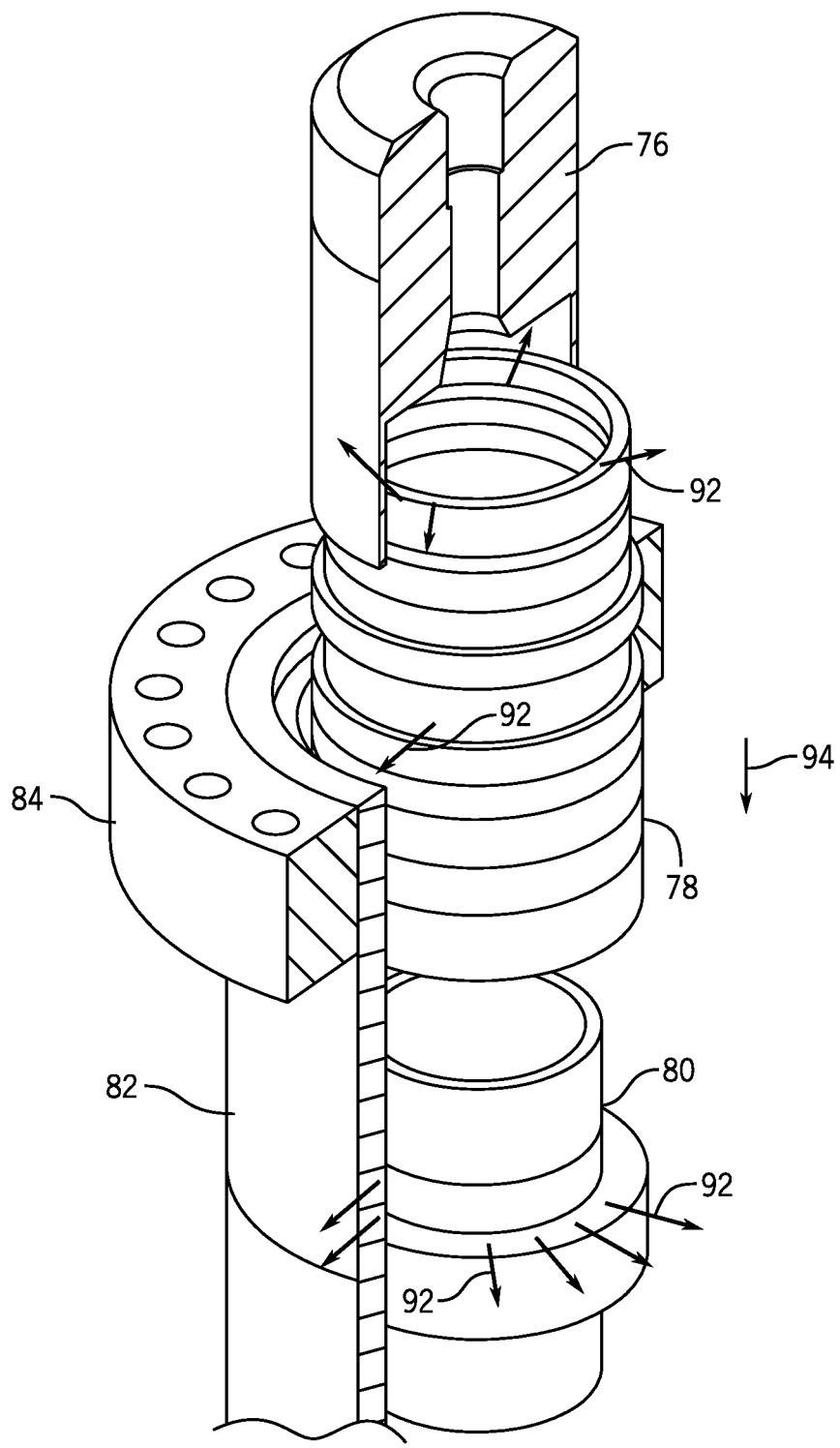
FIG. 5 is a cross-sectional perspective view of a portion of the as-built components of FIG. 4.

FIG. 5 is a cross-sectional perspective view of a portion of the as-built components of FIG. 4. As illustrated, the support running tool 76 is engaged with the support bushing 78, the threaded flange 84 is engaged with the casing head housing 82, and the casing hanger mandrel 80 is engaged with the casing head housing 82. The arrows 92 represent the contact force between the engaged as-built components, in which the length of each arrow 92 is proportion to the contact force.

As previously discussed, the motion mechanics simulation is configured to facilitate detection of anomalies, such as a collision between as-built components that blocks movement of one as-built component relative to another as-built component, incorrect threads that block rotation of one threaded as-built component relative to another threaded as-built component, and incorrect chamfers that may establish a significant contact force between as-built components and/or block movement of one as-built component relative to the other as-built component. In the illustrated embodiment, the computer detects a collision between support bushing 78 and the casing head housing 82 in response to performance of the motion mechanics simulation. For example, the motion mechanics simulation may simulate formation of the illustrated system. Accordingly, the support running tool 76 may lower the support bushing 78 in a downward direction 94 into the casing head housing 82. However, due to incompatible dimensions between the outer diameter of the support bushing 78 and the inner diameter of the casing head housing 82, a contact force may be established between the two as-built components as the support bushing 78 contacts the casing head housing 82. In the illustrated embodiment, the contact force exceeds a threshold value due to the incompatible dimension. As a result, the computer identifies a collision between the two as-built components (e.g., the two as-built components do not have interface and integration compatibility). As such, movement of the support bushing 78 in the downward direction 94 into the casing head housing 82 is blocked. In the illustrated embodiment, the dimensional variation between the measured dimensions of the support bushing 78 and the respective design model is less then or equal to the threshold value, and the dimensional variation between the casing head housing 82 and the respective design model is less than or equal to the threshold value. However, the two as-built components do not have interface and integration compatibility because the dimensions of the two as-built components are incompatible.

While detecting a collision is disclosed above, other interface and integration incompatibilities may also be detected during the motion mechanics simulation. For example, the motion mechanics simulation may rotate one threaded as-built component (e.g., the threaded flange 84) relative to another threaded as-built component (e.g., the casing head housing 82), such that the threads of the threaded components engage one another, to simulate formation and/or operation of the system. In response to detecting a contact force between the threads that is greater than a threshold contact force, the computer may identify incorrect threads. The computer may also detect incorrect chamfers that may establish a significant contact force between the as-built components and/or block movement of one as-built component relative to the other as-built component. Furthermore, the computer may detect incorrect fillets, misalignment between components, and excessive friction between as-built components during the motion mechanics simulation.

In certain embodiments, the determination of interface and integration compatibility may be based on a determination of a possibility of leakage between two as-built components. For example, if the computer identifies a collision between two as-built components, the gap between the components may be determined (e.g., by the computer). If the gap is insufficient for fluid to flow between the two as-built components, the computer may determine that the two as-built components have interface and integration compatibility even though there is a collision between the two as-built components. However, in other embodiments, the computer may determine that the two as-built components do not have interface an integration compatibility due to the collision even though the possibility of fluid leakage is low.

In certain embodiments, the motion mechanics simulation may determine both static and dynamic friction forces between as-built components. For example, while two as-built components are engaged with one another, the motion mechanics simulator may determine the force sufficient to cause movement of one as-built component relative to the other as-built component. Furthermore, once the first as-built component is moving relative to the second as-built component, the motion mechanics simulator may determine the force sufficient to continue movement of the first as-built component relative to the second as-built component. If the force sufficient to overcome the static friction is greater than a first threshold value, the computer may determine that the two as-built components do not have interface and integration compatibility. In addition, if the force sufficient to overcome the dynamic friction is greater than a second threshold value (e.g., less than the first threshold value), the computer may determine that the two as-built components do not have interface and integration compatibility.

Furthermore, in certain embodiments, the motion mechanics simulation may consider the effect of lubrication between two as-built components. For example, the computer (e.g., via the motion mechanics simulation) may determine the static and dynamic friction forces based on the properties and/or the quantity of lubricant between two as-built components. Even with the lubricant present, if the force sufficient to overcome the static friction is greater than a first threshold value, the computer may determine that the two as-built components do not have interface and integration compatibility, and if the force sufficient to overcome the dynamic friction is greater than a second threshold value (e.g., less than the first threshold value), the computer may determine that the two as-built components do not have interface and integration compatibility. However, if the computer determines that the two lubricated as-built components do not have interface and integration compatibility, the operator or the computer (e.g., automatically) may switch the lubricant to a lubricant having different properties. The motion mechanics simulation may then be performed with the new lubricant, and the interface and integration compatibility may be redetermined. This process (e.g., performed automatically by the computer) may continue until a lubricant that establishes interface and integration compatibility is identified, until all suitable lubricants are evaluated, or until a maximum number of iterations is reached. If a particular lubricant establishes interface and integration compatibility, the lubricant may be presented to the operator (e.g., via the computer and the user interface) and/or stored to facilitate formation of the physical system. However, if no effective lubricant is identified, the computer may determine the properties of a theoretical lubricant that would establish interface and integration compatibility (e.g., via iterative evaluation of theoretical lubricants having varying properties). The computer may then present the properties of the theoretical lubricant to the operator, thereby potentially facilitating development of the theoretical lubricant.

Furthermore, in certain embodiments, the motion mechanics simulation may determine forces based on an expected speed (e.g., translational speed, rotational speed, etc.) of one as-built component relative to another as-built component. For example, the dynamic friction force between two as-built components may be higher while one as-built component is moving faster relative to the other as-built component. Accordingly, if the dynamic friction force between two as-built components exceeds the threshold value, the operator or the computer (e.g., automatically) may reduce the speed until the dynamic friction force is reduced below the threshold value. The determined speed may then be presented to the operator (e.g., via the computer and the user interface) and/or stored to facilitate formation of the physical system. Furthermore, in embodiments in which a lubricant is disposed between the two as-built components, the effectiveness of the lubricant may be dependent on the speed of one as-built component relative to the other as-built component. Accordingly, if the dynamic friction force between two lubricated as-built components exceeds the threshold value while one as-built component is moving at an expected/desired speed relative to the other as-built component, the operator or the computer (e.g., automatically) may reduce the speed until the dynamic friction force is reduced below the threshold value. The determined speed may then be presented to the operator (e.g., via the computer and the user interface) and/or stored to facilitate formation of the physical system.

In certain embodiments, the motion mechanics simulation may enable an element of at least one as-built component to break in response to application of sufficient force to the at least one as-built component. For example, a lip may extend from an as-built component. Movement of the as-built component relative to another component may be blocked by contact between the lip and the other component. However, in response to application of a force sufficient to break the lip, the motion mechanics simulation may enable the lip to break, thereby facilitating continued movement of the as-built component. The breakage of the lip may be presented to the operator (e.g., via the computer and the user interface) and/or stored. Furthermore, in certain embodiments, the motion mechanics simulation may enable dynamic motion of one as-built component relative to another as-built component. For example, in response to contact between two as-built components, at least one as-built component may move (e.g., rotate and/or translate). In certain embodiments, the movement may cause misalignment between one or more as-built components. If the misalignment causes a collision or other anomaly, the computer may determine that the as-built components do not have interface and integration compatibility. In addition, in certain embodiments, in response to detection of a collision or other anomaly (e.g., incorrect thread, incorrect chamfer, etc.), the computer may determine how at least one component may be modified to avoid the collision/other anomaly. For example, the computer may determine that modifying the dimensions of at least one component may establish interface and integration compatibility between the as-built components. The computer may then present the modification to the operator (e.g., via the user interface) and/or store the modification to facilitate formation of the physical system.

Figure 6:
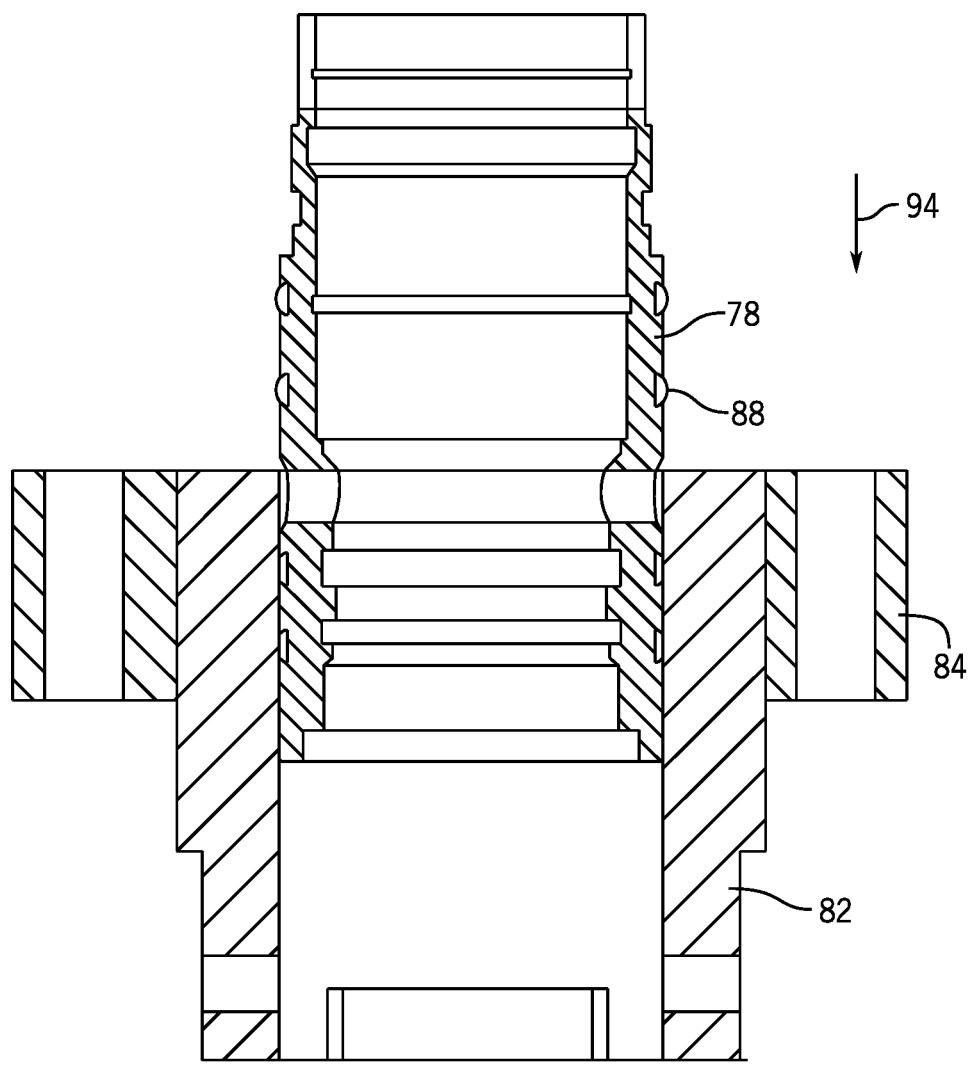
FIG. 6 is a cross-sectional view of a portion of the as-built components of FIG. 4.

FIG. 6 is a cross-sectional view of a portion of the as-built components of FIG. 4. As illustrated, the support bushing 78 is partially disposed within the casing head housing 82. In addition, the seal 88 is positioned above the casing head housing 82. As previously discussed, the deformation mechanics simulation is configured to facilitate detection of anomalies associated with the structural integrity of deformation-critical components, such as excessive/insufficient deformation of the as-built component, excessive stress and/or strain within the as-built component, and excessive contact pressure between the as-built component and another component of the system. In the illustrated embodiment, the seal 88 may be identified as a deformation-critical component. Accordingly, within the deformation mechanics simulation, forces may be applied to the seal 88 by the casing head housing 82 as the support bushing 78 moves in the downward direction 94 during formation of the system.

In response to the applied forces, the seal 88 may deform and move relative to the support bushing 78 and/or the casing head housing 82. If the deformation is greater than a threshold/expected deformation (e.g., due to contact between the seal 88 and a sharp point on the support bushing and/or casing head housing), the computer may identify excessive deformation (e.g., the seal 88 does not have interface and integration compatibility with the support bushing 78 and the casing head housing 82). For example, the excessive deformation may reduce the effectiveness of the seal, thereby establishing a potential leakage path. Accordingly, the deformation mechanics simulation may facilitate identification of the leakage path.

In certain embodiments, the determination of interface and integration compatibility may be based on a determination of a possibility of leakage between two components surrounding the seal. For example, as the seal deforms, the computer may determine the gap between the seal and at least one of the surrounding components. If the gap is insufficient for fluid to flow between the two surrounding components, the computer may determine that the two surrounding components and the seal have interface and integration compatibility even though there is excessive or insufficient deformation of the seal. However, in other embodiments, the computer may determine that the seal and the two surrounding components do not have interface and integration compatibility due to the seal deformation even though the possibility of fluid leakage is low.

In addition, the deformation mechanics simulation may be used to identify incorrect placement of a seal (e.g., elastomeric seal) or a ring (e.g., metal ring) with respect to an aperture. For example, within the deformation mechanics simulation, forces may be applied to the seal/ring by the surrounding components. In response to the applied forces, the seal/ring may deform and move such that a portion of the seal/ring enters an aperture, thereby causing excessive deformation of the seal/ring and/or stress/strain within the seal/ring. As a result, the computer may determine that the seal/ring and the surrounding components do not have interface and integration compatibility (e.g., because the seal/ring and the aperture are positioned too close to one another).

Furthermore, in certain embodiments, the deformation mechanics simulation may be used to identify initial contact between two as-built components. For example, the deformation of the seal 88 may be determined (e.g., periodically, etc.) as the support bushing 78 moves along the downward direction 94 relative to the casing head housing 82. In response to contact between the casing head housing 82 and the seal 88, the seal 88 may deform due to the corresponding contact force. Accordingly, a distance of movement of the support bushing 78 between an initial position and a seal contact position may be determined by the computer. The computer may compare the determined distance to an expected/design distance to determine whether the system may be formed as expected/designed.

In addition, in certain embodiments, the deformation mechanics simulation may be performed for operation of the system. For example, within the deformation mechanics simulation, forces may be applied to the seal 88 by fluid disposed between the casing head housing 82 and the support bushing 78. In response to the applied forces, the seal 88 may deform and move relative to the support bushing 78 and/or the casing head housing 82. If the deformation is greater than a threshold/expected deformation (e.g., due to contact between the seal 88 and a sharp point on the support bushing and/or casing head housing), the computer may identify excessive deformation (e.g., the seal 88 does not have interface and integration compatibility with the support bushing 78 and the casing head housing 82). For example, the excessive deformation may reduce the effectiveness of the seal, thereby establishing a potential leakage path. Accordingly, the deformation mechanics simulation may facilitate identification of the leakage path. Because the forces applied to the seal within the deformation mechanics simulation correspond to forces expected during operation of the system (e.g., due to the expected fluid pressure within the system), the virtual integration test may be more effective than a physical integration test in which the forces applied to certain components may be limited (e.g., due to limits on the fluid pressure that may be applied).

By way of further example, the deformation mechanics simulation may facilitate identification (e.g., by the computer) of excessive stress/strain within at least one deformation-critical component of the system. For example, the computer may determine that at least one deformation-critical component does not have interface and integration compatibility in response to determining that a stress within the at least one deformation-critical component is greater than a threshold stress for the deformation-critical component. If the deformation-critical component is a latch, the computer may identify excessive stress/strain within the latch in response to determining that the forces applied to the latch are sufficient to cause the latch to disengage. In certain embodiments, the computer may determine a stress field and/or a strain field within the deformation-critical component during the deformation mechanics simulation. Additionally or alternatively, the computer may determine the stress and/or strain within the deformation-critical component at certain identified locations (e.g., identified by the operator, automatically identified by the computer, etc.). While detection of excessive/insufficient deformation and excessive stress/strain are disclosed above, the deformation mechanics simulation may facilitate detection (e.g., by the computer) of other anomalies associated with the structural integrity of the deformation-critical component.

In certain embodiments, both the motion mechanics simulation and the deformation mechanics simulation may be performed on at least one as-built component. For example, if a collision is identified during the motion mechanics simulation, the deformation mechanics simulation may be performed on one or more of the as-built components involved in the collision. The deformation mechanics simulation may determine that at least a portion of at least one component involved in the collision may deform under the expected loads, thereby facilitating movement of the as-built components (e.g., to a target position). As a result, the computer may determine that the as-built components have interface and integration compatibility even though a collision was identified during the motion mechanics simulation. By way of further example, even if no anomalies are detected among one or more deformation-uncritical components during the motion mechanics simulation, the deformation mechanics simulation may be performed on at least one of the one or more deformation-uncritical components (e.g., to determine how deformation of the deformation-uncritical component(s) affects one or more deformation-critical components, to determine additional properties of the deformation-uncritical component(s), etc.). For example, a deformation-uncritical component may experience significant deformation during formation and/or operation of the system even when slight deformation is expected. As such, the operator or the computer (e.g., automatically) may select certain deformation-uncritical component(s) for evaluation using the deformation mechanics simulation (e.g., in addition to the motion mechanics simulation). In addition, the operator or the computer (e.g., automatically) may select certain deformation-critical component(s) for evaluation using the motion mechanics simulation (e.g., in addition to the deformation mechanics simulation).

In certain embodiments, if the computer determines that the deformation of a deformation-critical component is greater than the threshold value in response to performing the deformation mechanics simulation on the deformation-critical component, the operator and/or the computer (e.g., automatically) may switch the deformation-critical component to a deformation-critical component having different properties (e.g., modulus of elasticity, density, resilience, durometer, etc.). The deformation mechanics simulation may then be performed (e.g., automatically via the computer) with the new deformation-critical component, and the interface and integration compatibility may be redetermined (e.g., by the computer). In certain embodiments, the computer may continue to perform this process until a deformation-critical component that establishes interface and integration compatibility is identified or until a maximum number of iterations is reached. If a particular deformation-critical component establishes interface and integration compatibility, details of the deformation-critical component may be presented to operator (e.g., via the computer and the user interface) and/or stored to facilitate formation of the physical system. However, if no effective deformation-critical component is identified, the computer may determine the properties of a theoretical deformation-critical component that would establish interface and integration compatibility (e.g., via iterative evaluation of theoretical deformation-critical components having varying properties). The computer may then present the properties of the theoretical deformation-critical component to the operator, thereby potentially facilitating development of the theoretical deformation-critical component.

In addition, in certain embodiments, in response to detection of excessive/insufficient deformation or other structural integrity anomaly (e.g., excessive stress/strain, excessive contact pressure, etc.), the computer may determine how at least one component may be modified to avoid the excessive/insufficient deformation/other anomaly. For example, the computer may determine that modifying the dimensions of at least one component may establish interface and integration compatibility between the as-built components. The computer may then present the modification to the operator (e.g., via the user interface) and/or store the modification to facilitate formation of the physical system.

While components for a drilling or production system are disclosed above with reference to FIGS. 3-6, the virtual integration test system and method disclosed herein may be used to determine interface and integration compatibility of other suitable components. Furthermore, any of the threshold values disclosed above may be generic values (e.g., values for any as-built component), values specific to a particular type of component, or values specific to a particular component being evaluated. In addition, while the virtual integration test system and method uses the motion mechanics simulation and the deformation mechanics simulation to determine the interface and integration compatibility of certain component in the embodiments disclosed above, in other embodiments, the virtual integration test system and method may utilize other and/or additional suitable types of simulations.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A virtual integration test system, comprising:
a computer comprising a memory and a processor, wherein the computer is configured to:
receive data indicative of measured dimensions of a plurality of as-built components;
perform a motion mechanics simulation on at least two deformation-uncritical components of the plurality of as-built components;
perform a deformation mechanics simulation on at least one deformation-critical component of the plurality of as-built components, wherein the motion mechanics simulation and the deformation mechanics simulation are performed concurrently within a simulation environment;
determine interface and integration compatibility of the plurality of as-built components based on the motion mechanics simulation and the deformation mechanics simulation; and
output an output signal indicative of the interface and integration compatibility of the plurality of as-built components.

2. The virtual integration test system of claim 1, comprising a scanning device configured to output at least a portion of the data indicative of the measured dimensions of the plurality of as-built components.

3. The virtual integration test system of claim 2, wherein the scanning device comprises a three-dimensional (3D) scanner.

4. The virtual integration test system of claim 1, wherein the computer is configured to generate a solid model of each as-built component of the plurality of as-built components based on the data indictive of the measured dimensions of the plurality of as-built components.

5. The virtual integration test system of claim 1, wherein the computer is configured to:
compare the measured dimensions of each as-built component of the plurality of as-built components to dimensions of a design model of a respective as-built component; and
reject the respective as-built component in response to determining that a dimensional variation between the measured dimensions of the respective as-built component and the dimensions of the design model is greater than a threshold value.

6. The virtual integration test system of claim 1, wherein the computer is configured to identify at least one as-built component of the plurality of as-built components as either a deformation-uncritical component or a deformation-critical component based on at least one property of the at least one as-built component.

7. The virtual integration test system of claim 6, wherein the computer is configured to use artificial intelligence, data analytics, machine learning, or a combination thereof, to identify the at least one as-built component of the plurality of as-built components as either the deformation-uncritical component or the deformation-critical component.

8. The virtual integration test system of claim 1, wherein the computer is configured to determine that at least two as-built components of the plurality of as-built components do not have interface and integration compatibility in response to determining that a contact force between the at least two as-built components is greater than a threshold contact force.

9. The virtual integration test system of claim 1, wherein the computer is configured to determine that the at least one deformation-critical component does not have interface and integration compatibility in response to determining that a deformation of the at least one deformation-critical component is greater than a threshold deformation for the at least one deformation-critical component.

10. The virtual integration test system of claim 1, wherein the computer is configured to determine that at least one as-built component of the plurality of as-built components does not have interface and integration compatibility in response to determining that a stress within the at least one as-built component is greater than a threshold stress for the at least one as-built component.

11. A method for performing a virtual integration test, comprising:
- receiving, via a computer having a memory and a processor, data indicative of measured dimensions of a plurality of as-built components;
- performing, via the computer, a motion mechanics simulation on at least two deformation-uncritical components of the plurality of as-built components;
- performing, via the computer, a deformation mechanics simulation on at least one deformation-critical component of the plurality of as-built components, wherein the motion mechanics simulation and the deformation mechanics simulation are performed concurrently within a simulation environment;
- determining, via the computer, interface and integration compatibility of the plurality of as-built components based on the motion mechanics simulation and the deformation mechanics simulation; and
- outputting, via the computer, an output signal indicative of the interface and integration compatibility of the plurality of as-built components.

12. The method of claim 11, comprising:
- comparing, via the computer, the measured dimensions of each as-built component of the plurality of as-built components to dimensions of a design model of a respective as-built component; and
- rejecting, via the computer, the respective as-built component in response to determining that a dimensional variation between the measured dimensions of the respective as-built component and the dimensions of the design model is greater than a threshold value.

13. The method of claim 11, comprising identifying, via the computer, at least one as-built component of the plurality of as-built components as either a deformation-uncritical component or a deformation-critical component based on at least one property of the at least one as-built component.

14. The method of claim 11, comprising determining, via the computer, that at least two as-built components of the plurality of as-built components do not have interface and integration compatibility in response to determining that a contact force between the at least two as-built components is greater than a threshold contact force.

15. The method of claim 11, comprising determining, via the computer, that the at least one deformation-critical component does not have interface and integration compatibility in response to determining that a deformation of the at least one deformation-critical component is greater than a threshold deformation for the at least one deformation-critical component.

16. A virtual integration test system, comprising:
- a computer comprising a memory and a processor, wherein the computer is configured to:
  - receive data indicative of design models of a plurality of components;
  - perform a motion mechanics simulation on at least two deformation-uncritical components of the plurality of components;
  - perform a deformation mechanics simulation on at least one deformation-critical component of the plurality of components, wherein the motion mechanics simulation and the deformation mechanics simulation are performed concurrently within a simulation environment;
  - determine interface and integration compatibility of the plurality of components based on the motion mechanics simulation and the deformation mechanics simulation; and
  - output an output signal indicative of the interface and integration compatibility of the plurality of components.

17. The virtual integration test system of claim 16, wherein the computer is configured to identify at least one component of the plurality of components as either a deformation-uncritical component or a deformation-critical component based on at least one property of the at least one component.

18. The virtual integration test system of claim 16, wherein the computer is configured to determine that at least two components of the plurality of components do not have interface and integration compatibility in response to determining that a contact force between the at least two components is greater than a threshold contact force.

19. The virtual integration test system of claim 16, wherein the computer is configured to determine that the at least one deformation-critical component does not have interface and integration compatibility in response to determining that a deformation of the at least one deformation-critical component is greater than a threshold deformation for the at least one deformation-critical component.

20. The virtual integration test system of claim 16, wherein the computer is configured to determine that at least one component of the plurality of components does not have interface and integration compatibility in response to determining that a stress within the at least one component is greater than a threshold stress for the at least one component.

* * * * *